United States Patent [19]
Carlson et al.

[11] Patent Number: 6,052,525
[45] Date of Patent: Apr. 18, 2000

[54] METHOD OF ERROR HANDLING IN A FRAMEWORK

[75] Inventors: Brent Carlson, Sollentuna; Tore Dahl, Hasselby, both of Sweden; Bradley Fawcett, Byron; Timothy Graser, Rochester, both of Minn.

[73] Assignee: International Business Machines Corporation, Armonk, N.Y.

[21] Appl. No.: 09/041,114

[22] Filed: Mar. 11, 1998

[30] Foreign Application Priority Data

Aug. 14, 1997 [EP] European Pat. Off. .............. 97114036

[51] Int. Cl.[7] ............................. G06F 9/44; G06F 11/00
[52] U.S. Cl. ......................... 395/701; 707/104; 707/103; 707/514; 714/47; 714/38
[58] Field of Search ............................ 395/701; 707/104, 707/103, 100, 514, 531; 709/302; 714/47, 38

[56] References Cited

U.S. PATENT DOCUMENTS

| | | | |
|---|---|---|---|
| 4,566,078 | 1/1986 | Crabtree | 704/8 |
| 5,283,898 | 2/1994 | Kusumoto et al. | 707/1 |
| 5,613,122 | 3/1997 | Burnard et al. | 395/701 |
| 5,652,884 | 7/1997 | Palevich | 707/100 |
| 5,715,460 | 2/1998 | Acker et al. | 395/705 |
| 5,936,860 | 8/1999 | Arnold et al. | 395/701 |

FOREIGN PATENT DOCUMENTS

| | | | |
|---|---|---|---|
| 0121071 | 10/1984 | European Pat. Off. | G06F 3/02 |
| 0398646 | 11/1990 | European Pat. Off. | G06F 15/14 |

OTHER PUBLICATIONS

Gittler et al, "An Object–Oriented Application Framework for DCE–Based Systems," Dec. 1995 Hewlett–Packard Journal, pp. 55–60.

Eschelbeck et al, "A framework of classes for distributed controlling," EUROMICRO 94, Proceedings of the 20th EUROMICRO Conference on System Architecture and Integration, pp. 240–246, Sep. 1994.

Christian Rathke, "Object–oriented Programming and Frame–based Knowledge Representation," TAI '93, Proceedings of teh Fifth International Conference on Tools with Artificial Intelligence, pp. 95–98, Nov. 1993.

IBM Technical Disclosure Bulletin, vol. 34, No. 4B, Sep. 1991, "Smalltalk/V PM Officevision/2 Error Manager," pp. 310–312.

*Primary Examiner*—Tariq R. Hafiz
*Assistant Examiner*—Tuan Q. Dam
*Attorney, Agent, or Firm*—Roy W. Truelson; James R. Nock

[57] ABSTRACT

The present invention relates to a method of developing a software system using Object Oriented Technology. The present invention addresses the problem of providing a technical foundation for the development of software applications using Object Oriented Technology and frameworks. The present invention solves this problem with a framework supporting flexible interchange of domain algorithms. The present invention is applicable in the technical field of application development of software systems, e.g., for a business application as Financial or Logistic and Distribution, wherein it is the purpose of frameworks to provide significant portions of the application that are common across multiple implementations of the application in a general manner, easy to extend for specific implementation.

11 Claims, 2 Drawing Sheets

METHOD OF ERROR HANDLING IN A FRAMEWORK

RELATED APPLICATIONS

The present application is related to the following commonly assigned co-pending applications filed on the same date as the present application, each of which is herein incorporated by reference:

U.S. Ser. No. 09/038,024 by Kathryn Bohrer et al., entitled "A Method of Developing a Software System Using Object Oriented Technology";

U.S. Ser. No. 09/038,352 by Brent Carlson et al., entitled "A Method of Using Decoupled Chain of Responsibility";

U.S. Ser. No. 09/038,351 by James Carey et al., entitled "Framework for Business Applications Providing Financial Integration";

U.S. Ser. No. 09/038,349 by James Carey et al., entitled "Framework for Business Applications Using Cached Aggregate and Specification Key";

U.S. Ser. No. 09/038,025 by James Carey et al., entitled "Software Business Objects in a Multi-level Organizational Structure"; and U.S. Ser. No. 09/038,381 by Anders Nilsson, entitled "A Method of Locating Software Objects in Different Containers".

FIELD OF THE INVENTION

The present invention relates to a method of developing a software system using Object Oriented Technology and frameworks, in particular relates to a method for handling errors.

BACKGROUND OF THE INVENTION

In order to maintain or enlarge their competitiveness, enterprises of almost every type of business all over the world have to rework and bring up to date their information technology to meet customer's requirements and thus to be successful in the market. But keeping an information system based on traditionally developed software up to date is at least an expensive undertaking, and in many cases it is an unsolvable problem. Object Oriented Technology or simply Object Technology, often abbreviated "OOT" or simply "OT", has the technical potential to overcome the problems associated with development, maintenance, and extension of software applications within a company's information system and to provide interoperability and adaptability across multiple applications and hardware platforms.

Object Oriented Technology describes a method for the development of operating software as well as application software for a computer system. Contrary to the traditional, non-object oriented ways of developing software, Object Oriented Technology comprises and uses pre-engineered "methods" and "objects" for the development of software, comparable to tools and parts for the development of an automobile.

Similar to the development of an automobile, wherein not each required screw is developed individually, but standardized screws are used which can be individually adapted by shortening to the required length, within the development of software, Object Oriented Technology provides a "class" as a kind of software template from which individual "objects" can be instantiated. These classes are usually stored in a software library or a so called "class library." A class library is simply a collection of several classes stored together in a special filing format called a library.

In Object Oriented Technology an "object" is a self-contained piece of software consisting of related data and procedures. Data means information or space in a computer program where information can be stored, e.g., a name or an inventory part number. Procedures are parts of a program that cause the computer to actually do something, e.g., the parts of a program which perform calculations or the part of a program that stores something on a computer disk. In Object Oriented Technology, an object's procedures are called "methods."

The concept of an object being a self-contained piece of software having data and procedures inside itself is a new way of developing software. In non-object oriented software, most of the data for an entire program is often grouped together near the beginning of the program, and the procedures then follow this common pool of data. This conventional method worked okay for smaller programs, but as soon as a piece of software started to grow and become somewhat complex, it became increasingly difficult to figure out which procedures were using which data. This made it quite difficult and expensive to debug or change traditional software programs.

In Object Oriented Technology, it is generally easier to debug, maintain, and enhance object oriented software. The three most popular object oriented programming languages are probably "C++", "JAVA", (a trademark of Sun Microsystems) and "SMALLTALK" (a trademark of Xerox Corporation). The concept that both data and methods are contained inside an object is called "encapsulation." Part of the concept of encapsulation is that an object has a predictable way of communicating with other objects, a so called predictable "interface" or sometimes also called the method contract.

Provided that interface will not be changed, the code or methods inside the object can be changed without disrupting other objects' ability to interact with that object. For example, a TAX CALCULATION object would have a predictable interface for use by PAYCHECK objects. Provided that interface will not be changed, the detailed program code inside the TAX CALCULATION object could be changed whenever the tax laws changed, and no other objects in the payroll system would have to know anything about such changes.

In Object Oriented Technology, the term "inheritance" is used to communicate the concept that one object can inherit part of its behavior and data from another object, e.g., since an employee is a type of person, an EMPLOYEE object might inherit the characteristics of a PERSON object, such as having name, birth date, and address data, as well as an EMPLOYEE object might inherit methods for updating and displaying these data.

Even if an object inherits some of its characteristics from other objects, that object can, and usually would, also have its own non-inherited characteristics, e.g., whereas a PERSON object would have an inheritable method to display a person's address, a PERSON object would probably not have a method for displaying paycheck history, since not all persons get paychecks. Because an EMPLOYEE object could not inherit this method from a PERSON object, an EMPLOYEE object would have to define its own method for displaying paycheck history.

Although Object Oriented Technology clearly seems to be the most sophisticated way for the development, maintenance, and extension of software applications, many companies developing software applications are concerned about the cost and risks involved with the rework of existing applications and with the construction of new applications using Object Oriented Technology. For those software application developers, a technical foundation for software applications has to be built as a tool using Object Oriented Technology as the basis, allowing each developer to develop highly unique software products. This technical foundation is formed by frameworks comprising the basic application structure which software application developers previously had to develop by themselves.

In Object Oriented Technology, the term "framework" is used to describe a reusable set or collection of classes which work together to provide a commonly needed piece of functionality not provided by any of the individual classes inside the framework. Thus a framework defines a specific way in which multiple objects can be used together to perform one or more tasks which no single object performs. In other words, a framework is a reusable, predefined and pre-engineered bundle of several objects which address a recurring programming problem.

Frameworks provide a way of capturing a reusable relationship between objects, so that those objects do not have to be reassembled in that same relationship every time they are needed. Frameworks provide a way of grouping multiple objects together to perform some function which should not have to be thought through each time at the underlying object level. For example, a PRINT framework would consist of all the objects necessary for a programmer to easily print something on any printer, and would probably include objects for printer selection, spooling to disk or error detection as "out of paper." Frameworks can be regarded as an group of software objects which contain a technical foundation for a software application. For example in the business field of Financial, Logistic and Distribution or Production. Although a framework represents a skeleton of a software application, usually a framework is not an executable software program.

By providing frameworks as the technical foundation for developing software applications, the following problems have to be addressed:

Applications have to support all hardware platforms and related software operating systems relevant on the market. Applications have to fulfill the requirements related to client/server configurations including the requirement for graphical user interfaces and windowing techniques. Also, applications have to offer internet compatibility and access on demand. Furthermore applications have to provide integrated solutions with respect to installed software.

Known from the prior art, see e.g. E. GAMMA et al: "Design Patterns: elements of reusable object-oriented software", Addison-Wesley, 1995, ISBN 0-201-63361-2, are two object oriented design patterns, "Chain of Responsibility" and "Strategy".

Concerning the requirements for error handling in a framework, two problems were encountered. The first problem involved the translation of the messages associated with errors into an appropriate natural language for the end user. The common approach for handling translatable error message text in a national language system (NLS) environment is to associated message identifiers (Ids) rather than the text of the message itself with an error. At the time the message associated with the error needs to be displayed, the Id of the message and the language of the end user is mapped to an actual text string in the appropriate language. This scheme is usually enhanced by associating replacement parameters with the error that on translation are inserted into marked positions in the actual translated message text string. One problem encountered is that the requirements called for the replacement parameters themselves to be translatable. This means that Ids, class names, enum values, etc. should be translated appropriately when placed into the translated message. The standard scheme described above does not allow this.

The second problem encountered with error handling in a framework was adding runtime flexibility in the degree of error checking done for a given operation. There are two approaches that can be used. The first is to stop any further error checking in a process after the first error has been encountered. The caller is then made aware of that one error. The second approach is to continue checking for other errors after the first error is encountered and to stop checking only when all error conditions are checked or when previous errors make all remaining errors meaningless. The caller is made aware of all errors that were found. This approach is similar to the approach a compiler uses when it processes a unit of source code. For the rest of this application, this approach is referred to as "bundling" of errors, where the first approach did not allow "bundling." Known error handling schemes require that a choice between whether errors will be bundled or not be made at design time, thus there is no possibility to change between the two approaches at runtime.

Within the accompanying figures, representation standards for classes, objects, relationships, etc. are used at least partly according to Grady Booch: "Object-Oriented Analysis and Design with Applications", second edition, The Benjamin/Cummings Publishing Company, Ind., Redwood City, Calif., USA.

OBJECT OF THE INVENTION

It is an object of the present invention to provide a technical foundation for the development of software applications using Object Oriented Technology which overcomes the above discussed problems.

It is a further object of the present invention to provide a framework with an error handling method wherein the replacement parameters themselves are translatable. Furthermore, it is an object to provide a framework with an error handling method wherein error bundling can be enabled and disabled at runtime.

SUMMARY OF THE INVENTION

The present invention solves this object with methods and apparatus as laid down in enclosed independent claims. Particular embodiments of the present invention are presented in the respective dependent claims.

Furthermore, the present invention provides a framework to be used for developing a software system, e.g., for a business application, said framework supporting translatable replacement text within a translatable error message, characterized in that a hierarchy of replacement text classes is defined to represent replaceable and non-replaceable types of replacement text, wherein the root of said hierarchy is a base class representing any type of replacement text, said base class provides a format-method to return said replacement text in form of a translated string.

Furthermore the present invention provides a framework that allows enabling and disabling error bundling at runtime, wherein an error message collection class is defined holding a collection of error messages and providing methods for adding, removing and accessing the contained error messages, an instance of said error message collection class is created during the validation phase of a framework method, and an error message object is created and added via the "addErrorMessage" interface on the error message collection object with each error found.

DETAILED DESCRIPTION OF THE PREFERRED EMBODIMENT

Figure 1:
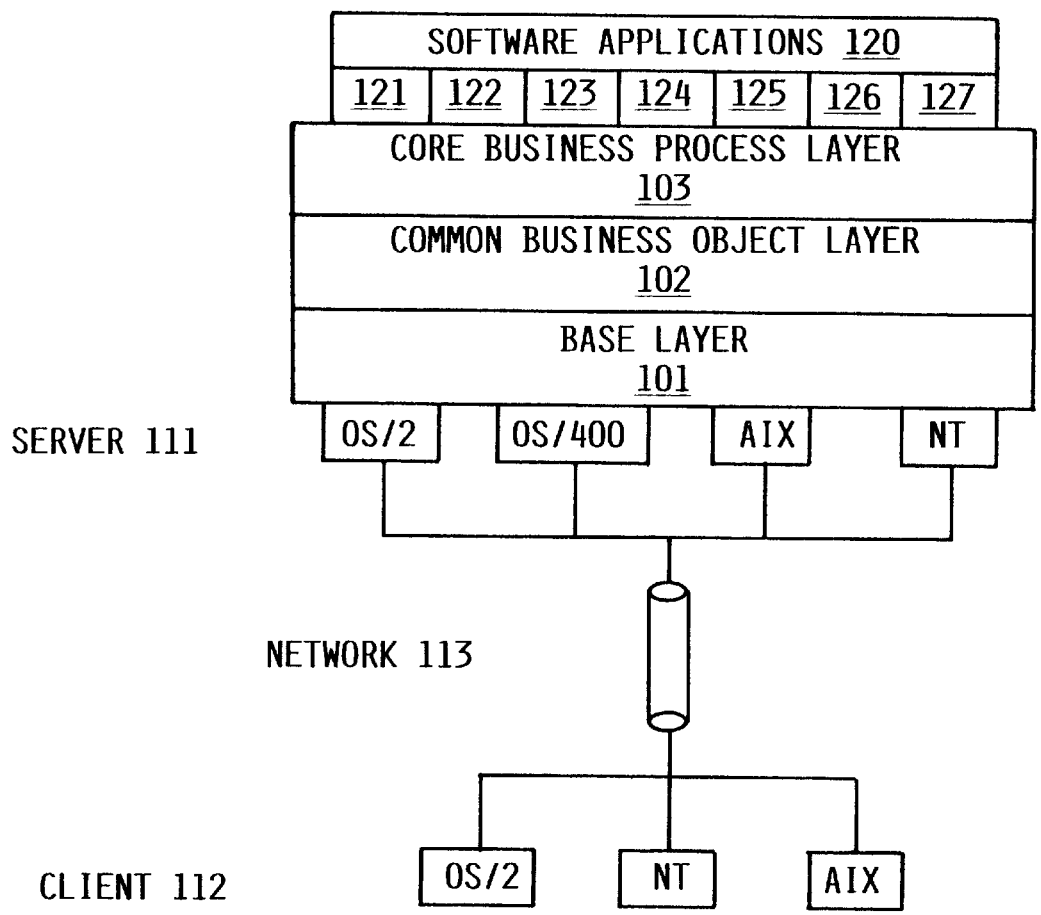
FIG. 1 shows a four layer schema from which software application can be developed using the present invention.

Developing software applications using the subject of the present invention as a development tool can be regarded as built up of four layers as shown in FIG. 1.

The lowest layer is the base layer 101. The base layer 101 provides and manages the interface with the server hardware 111 which is potentially running under different operation systems such as OS/2, OS/400, AIX, and NT. The server hardware 111 is connected with client hardware 112 via a communication network 113. The client hardware 112 may also potentially running under different operation systems such as OS/2, NT, and AIX. The embodiment shown in FIG. 1 shows the development of the server portion of a client/server application only.

The Base layer 101 represents the technical foundation for the higher level objects including many functions near to an operating system such as finding objects, keeping track of their names, controlling access to them, resolving conflicts, security administration, and installation. The Base layer 101 also includes the so called Object Model Classes which provide a consistent model for building objects while hiding the complexity of the underlying infrastructure from the software application developer. The Base layer 101 can be regarded as a kind of lower middleware necessary for the application of the Object Technology above it using the interface functionality provided by the Base layer 101.

Above the Base layer 101 there is a layer comprising Common Business Objects 102. This Common Business Object layer 102 provides a large number of objects which perform functions commonly needed within a business application, e.g., date and time, currency, address, units of measure, and calendar. These Common Business Objects represent the building blocks from which software application developers can select and create business applications, e.g., these Common Business Objects can be copied and extended to perform new functions as for example the date and time object can be extended to handle the Chinese calendar.

The layer 103 above the Common Business Objects layer 102 already comprises Core Business Processes and can be regarded as the Core Business Process layer 103. Although this layer 103 usually does not provide executable code, within this layer 103 the business software applications developed using the present invention begin to take shape. Each Core Business Process layer is built for one specific type of application, as for example General Ledger or Warehouse Management.

This Core Business Process layer 103 can be regarded as an upper middleware which—although not a complete software application program—already contains the basic functions which all of the application programs of this type require. It is the Core Business Process layer 103 which creates the application frameworks, wherein some of the Common Business Objects are linked to a large number of objects specific to the type of framework being built, e.g., Warehouse Management. The resulting framework is constructed in a way to contain commonly used functions as well as to be easy to extend.

On top of the above described three layer model the application software is located, created by the software application developer and representing executable code. It is the choice of a software application developer whether to use only the base layer 101, the base layer 101 and the Common Business Object layer 102, or all three layers 101, 102, and 103 for the development of his software application. In every case, he has to develop a remaining part of the application by himself and, therefore, every resulting software application program will be a completely unique product.

It has to be noted that the subject of the present invention is represented within the three layer model 101, 102, and 103 and is not represented by the executable code of the software application 121 developed using the present invention.

Figure 2:
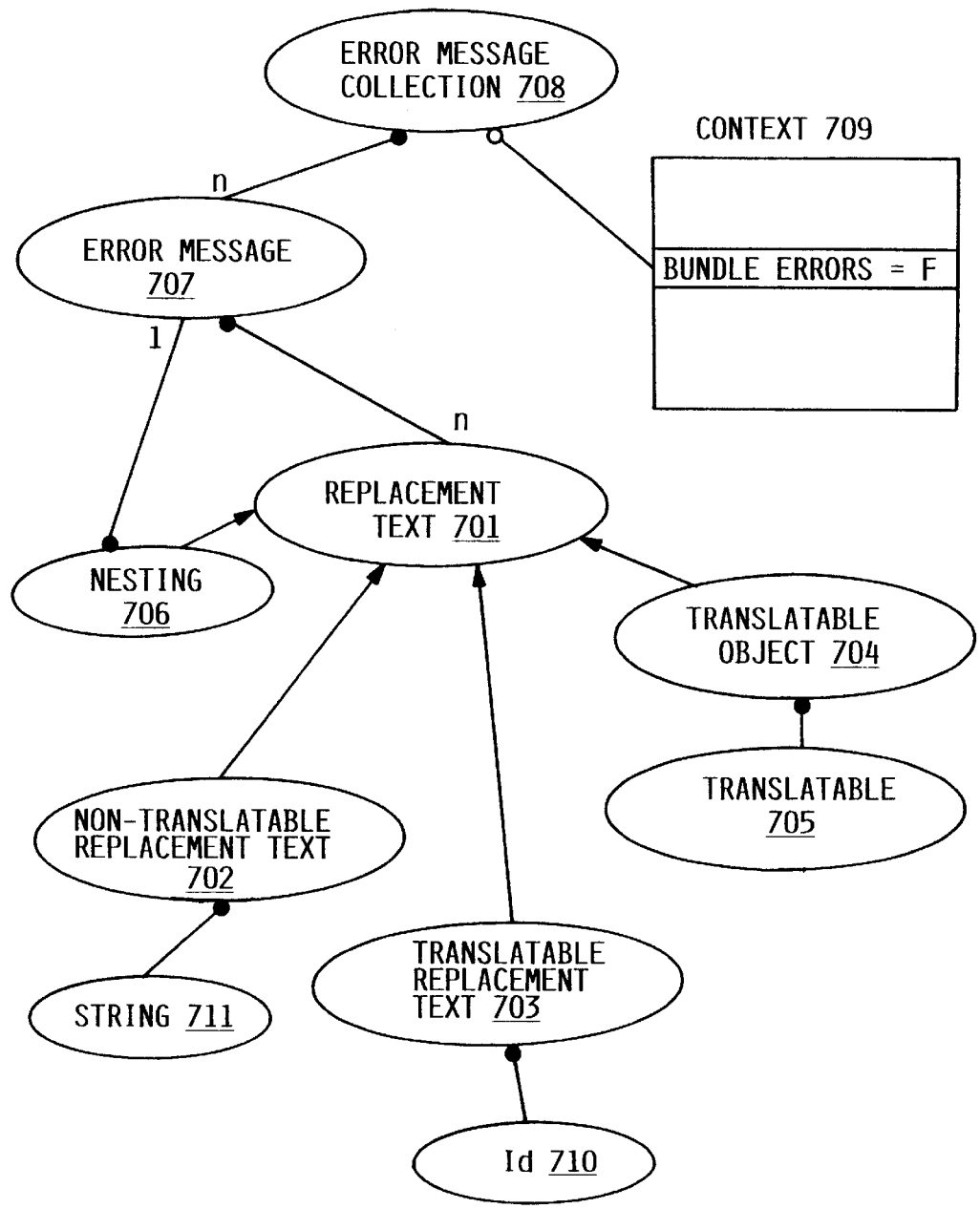
FIG. 2 shows a hierarchy of replacement text classes to represent replaceable and non-replaceable types of replacement text.

The common approach to provide replacement parameters in translatable messages is to limit the replacement parameters to being strings or some other non-translatable primitive types. The solution to the problem of providing translatable replacement text was to define a hierarchy of replacement text classes to represent replaceable and non-replaceable types of replacement text as shown in FIG. 2. The root of this hierarchy is a base class representing any type of replacement text 701. This class provides a "format" method to return the replacement text in the form of a translated string. Inheriting from the base class are concrete replacement text classes for translatable replacement text 703, non-translatable replacement text 702, and a class for holding translation sensitive objects 704 such as dates and currencies.

The translatable replacement text class 703 holds an Id 710 of a translatable message. When the format method is called on a translatable replacement text object the ID and the language being used is mapped to actual text in the appropriate language. The ID used in a translatable replacement text object is often a class name, or an enum value that, when resolved, will produce the proper name of Id in the language matching the containing message text.

The non-translatable replacement text class 702 holds a string 711 that will be placed directly into the message text without translation such as a business object ID. This class provides the equivalent functionality to the common replacement text approach described earlier.

A third concrete class holds translatable objects 704. This is implemented in the framework by introducing an abstract interface for objects 705 that are themselves translatable. The abstract interface in the present framework is called "Translatable" and also introduces a "format" method to produce a formatted representation of the-object. Classes in the framework such as date, currency value, and decimal implement the translatable interface. The translatable object replacement text concrete class holds an object of type Translatable and implements the "format" method by calling format on the contained translatable object.

It is possible to create another generic type of replacement text concrete class 706 that itself has a message ID and holds a collection of replacement text objects to insert into the replacement positions in the referenced message. Such a class enables nesting translatable replacement text in arbitrarily deep hierarchies, that is, translatable replacement text could itself contain translatable replacement text.

To address the problem of enabling and disabling error bundling at runtime the following approach is used: A class 708 was defined that holds a collection of error messages 707 and provides methods for adding, removing and accessing the contained error messages. During the validation phase of a framework method, an instance of the error message collection class is created and with each error found (each validation step that fails) an error message object is created and added via the "addErrorMessage" interface on the error message collection object. The code in the framework method is written such that all error checking steps are performed. If, at the end of the validation phase of the method, it is determined that one or more error messages have been created, an exception object is created to which the error message collection object is attached. Finally the exception object is thrown.

To provide users the ability to enable and disable error bundling at runtime, a flag is added to the context 709 or environment of the users process (in the present embodiment of a framework it is added to the Distributed Process Context object) that determines whether error bundling is enabled or disabled for the process. A static method is provided to allow the user to set the flag. The behavior of the "addErrorMessage" on the error message collection class varies depending on the value of the bundling flag.

If the bundling flag is set to "bundling enabled", the "addErrorMessage" method will simply add the given error message to its internal collection. This allows all error messages from a given framework method to be entered into the collection before it is attached to an exception and thrown back to the caller. If the bundling flag is set to "bundling disabled", the "addErrorMessage" method will add the error message to its internal collection, then create an exception object to which it attaches itself as the error collection object and then throw the exception. Thus, when framework code adds the first error message to the error message collection, an exception is thrown containing the error message collection and the single contained error message, stopping further processing of the method. In the example of FIG. 2, the bundling flag is set to FALSE (bundling disabled).

Note that changing of bundling behavior is completely encapsulated in the "addErrorMessage" method which enables the code of the framework method to be written in such a way that is completely independent of whether bundling is enabled or disabled. Therefore, bundling can be enabled or disabled at runtime without requiring changes to framework design or code.

We claim:

1. A computer readable medium incorporating a framework used within an object oriented programming environment for developing a software system, said framework supporting translatable replacement text, said framework comprising:

a hierarchy of replacement text classes representing replaceable and non-replaceable types of replacement text;

a base class as a root of said hierarchy, said base class representing any type of replacement text; and means for allowing said base class provides a format-method to return said replacement text in form of a translated string.

2. The framework according to claim 1, further comprising:

a concrete replacement text class for translatable replacement text, said concrete replacement text class inheriting from said base class; and a class for non-translatable replacement text, said class for non-translatable replacement text inheriting from said base class.

3. The framework according to claim 2, further comprising:

a class for holding translation sensitive objects, said class for holding translation sensitive objects inheriting from said base class.

4. The framework according to claim 2, wherein said replacement text class is capable of holding a translatable message itself containing replacement text providing an ability to nest translatable messages within a single translatable message to an arbitrarily deep level.

5. The framework according to claim 3, wherein said class for holding translation sensitive objects includes an abstract interface defining a format method and implemented by a plurality of translatable object classes, each translatable object class representing objects of a respective type which are themselves translatable.

6. The framework according to claim 5, wherein said plurality of translatable object classes include a class representing a currency value.

7. The framework according to claim 5, wherein said plurality of translatable object classes include a class representing a date.

8. A computer readable medium incorporating a framework used within an object oriented programming environment to be used for developing a software system, said framework supporting error messages, said framework comprising:

an error message collection class holding a collection of error messages and providing methods for adding, removing and accessing said contained error messages, wherein an error message collection object is created as an instance of said error message collection class during a validation phase of a framework method, wherein an error message object is created and added to said error message collection object with each error found; and means for allowing selective enabling and disabling of error message bundling at runtime.

9. The framework according to claim 8, wherein in said framework method code is written such that all error checking steps are performed.

10. The framework according to claim 9, wherein said error message collection class determines from an associated context whether to terminate error checking at a point of first error detection or to allow said framework method code to complete all error checking steps and bundle resulting messages into a single error report.

11. The framework according to claim 9, wherein said error message collection class includes an add-error-message method, said add-error-message method adding error messages to said error message collection object, wherein said add-error-message method additionally creates an exception object containing the error collection object if error message bundling at runtime is disabled.

* * * * *